United States Patent [19]
Toles et al.

[11] Patent Number: 6,033,573
[45] Date of Patent: *Mar. 7, 2000

[54] ACTIVATED NUTSHELL CARBONS FROM AGRICULTURAL WASTE

[75] Inventors: Christopher A. Toles, River Ridge; Wayne E. Marshall, Slidell; Mitchell M. Johns, Metaire, all of La.

[73] Assignee: The United States of America as represented by the Secretary of Agriculture, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,429

[22] Filed: May 29, 1997

[51] Int. Cl.[7] .............................. C01B 31/12; B01J 20/20
[52] U.S. Cl. .......................... 210/688; 502/423; 502/428
[58] Field of Search ............................ 210/688; 502/423, 502/424, 425, 426, 427, 428

[56] References Cited

U.S. PATENT DOCUMENTS

| | | | |
|---|---|---|---|
| 4,760,046 | 7/1988 | Bürger et al. | 502/425 |
| 5,206,207 | 4/1993 | Tolles | 502/424 |
| 5,276,000 | 1/1994 | Matthews et al. | 502/424 |
| 5,304,527 | 4/1994 | Dimitri | 502/425 |

*Primary Examiner*—David A. Simmons
*Assistant Examiner*—Betsy J. Morrison
*Attorney, Agent, or Firm*—M. Howard Silverstein; Joseph A. Lipovsky; John D. Fado

[57] ABSTRACT

Activated carbons derived from nutshells, and for use in adsorption of metallic cations, are prepared utilizing phosphoric acid activation with concurrent oxidation under air. The acid activation is carried out utilizing a one or two-step heating regime subsequent to the infusion of the phosphoric acid into the nutshell material during which concurrent oxidation is achieved by exposure to atmospheric oxygen. Further oxidation is optionally achieved by equilibration of the nutshell carbons to room temperature under air. Prior to utilization, a washing step is employed to remove unwanted acid from the carbon product.

9 Claims, No Drawings

ACTIVATED NUTSHELL CARBONS FROM AGRICULTURAL WASTE

BACKGROUND OF THE INVENTION

1. Field of the Invention

Activated carbons are high porosity, high surface area materials used in industry for purification and chemical recovery operations as well as environmental remediation. Toxic metals contamination of various water sources is a significant problem in many parts of the United States. Activated carbons, which can be produced from a number of precursor materials including coal, wood and agricultural wastes, are now being actively utilized for remediation of this problem. Carbon production is an expanding industry in the United States, with a present production rate of over 300 million pounds a year and a growth rate of over 5% annually. The present invention relates to the development of specifically modified granular carbons from agricultural waste products that possess enhanced adsorption properties with regard to the uptake of metal ions.

2. Description of the Prior Art

The production of carbon, in the form of charcoal, is an age-old art. Carbon, when produced by non-oxidative pyrolysis, is a relatively inactive material possessing a surface area limited to several square meters per gram. In order to enhance its activity, a number of protocols have been developed. These include chemical treatment of the carbonaceous material with various salts or acids prior to pyrolysis, or a reaction of the already pyrolyzed product with high temperature steam. Activated carbon is able to preferentially adsorb organic compounds and non-polar materials from either liquid or gaseous media. This property has been attributed to its possession of a form which conveys the desirable physical properties of high porosity and large surface area.

Whitehead et al., in a paper entitled "Studies in the Utilization of Georgia Pecans", (*State Engineering Experiment Station Bulletin, The Georgia School of Technology*, Vol.1, No.5, December 1938, pp. 3–11), disclose the production of activated charcoal by treating pecan hulls with hydrochloric acid and then heating in an atmosphere of carbon dioxide for four hours at a temperature ranging from 800–1000° C. This product was described as having the same decolorizing power on water solutions of azo dyes as commercially available activated charcoals.

Bevia et al., in an article entitled "Activated Carbon from Almond Shells. Chemical Activation. 1. Activating Reagent Selection and Variables Influence" (*Ind. Eng. Chem. Prod. Res. Dev.* 1984, 23, 266–269), discuss the preparation of activated carbon from almond shells. The activating chemicals $H_3PO_4$, $ZnCl_2$, $K_2CO_3$, and $Na_2CO_3$ were utilized in the study, with products derived from activation by $ZnCl_2$ giving the best results. It was further found that the impregnation ratio (activating reagent/raw material) was the most critical parameter, with materials made at ratios higher than 100% giving the best products.

Jagtoyen et al., in their paper entitled "Some Considerations of the Origin of Porosity in Carbons from Chemically Activated Wood", (*Carbon*, Vol. 31, No. 7, pp.1185–1192, 1993), investigated the conversion of white oak to activated carbons by reaction with phosphoric acid and subsequent heat treatment under nitrogen to temperatures ranging from 50° C. to 650° C. They found that the carbon structures created undergo significant expansion, with an accompanying development of high surface area, at reaction temperatures ranging from 250° C. to 450° C. At reaction temperatures above 450° C. there is secondary product contraction with an associated loss of product porosity. From this evidence it was concluded that porosity development is directly related to the retention and dilation of cellular material.

Molina-Sabio et al., in their paper entitled "Modification in Porous Texture and Oxygen Surface Groups of Activated Carbons by Oxidation", (*Characterization of Porous Solids II*, Rodriguez-Reinoso et al., [edit.] 1991 Elsevier Science Publishers B.V., Amsterdam), disclose that while oxidation treatment of fruit pits by either air or chemical means ($HNO_3$ or $H_2O_2$) does not substantially modify the microporosity of the carbon structures created, the chemical nature of the carbon surface is changed considerably. No projected uses for these carbons are set forth.

Molina-Sabio et al., in a publication entitled "Influence of the Atmosphere used in the Carbonization of Phosphoric Acid Impregnated of Peach Stones" (*Carbon*, pp. 1180–1182, 1995), teach that the inclusion of air during the heating step of the acid activation of carbons should not result in any appreciable reaction with the carbon material. This is premised upon the fact that there is a continuous evolution of decomposition gases during the activation process.

Periasamy et al., in an article entitled "Process Development for Removal and Recovery of Cadmium from Wastewater by a Low-Cost Adsorbent: Adsorption Rates and Equilibrium Studies", (*Ind. Eng. Chem. Res.*, 33, 317–320, 1994), show that at a concentration of 0.7 g/L, activated carbon produced from peanut hulls was able to achieve an almost quantitative removal of Cd(II) present at a concentration of 20 mg/L in an aqueous solution at a pH range of 3.5–9.5.

Balci et al., in their article "Characterization of Activated Carbon Produced from Almond Shell and Hazelnut Shell", (*J. Chem. Tech. Biotechnol.*, 1994, 60, 419–426), show that chemical activation of ammonium chloride-impregnated almond and hazelnut shell at 350° C. and 700° C. gave products with surface area values in excess of 500 $m^2/g$ and 700 $m^2/g$ respectively. These values were approximately twice that observed for products derived from untreated raw materials.

Moreno-Castilla et al., in an article entitled "Activated Carbon Surface Modifications by Nitric Acid, Hydrogen Peroxide, and Ammonium Peroxydisulfate Treatments" (*Langmuir*, 1995, 11, 4386–4392), disclose the principle that acidic oxygen surface complexes are formed on activated carbons as a result of their treatment with either gas or solution phase oxidizing agents; and that inclusion of these complexes effect changes in the behavior of activated carbons when used either as adsorbents or catalysts.

Rivera-Utrilla et al., in their publication entitled "Effect of Carbon—Oxygen and Carbon—Nitrogen Surface Complexes on the Adsorption of Cations by Activated Carbons", (*Adsorption Science & Technology*, 1986, 3, 293–302), disclose that activated carbons obtained from almond shells are capable of removing trace amounts of various metal ions from aqueous solutions.

While various methodologies for the creation of granular activated carbons exist, there remains a need for the creation of alternate viable and cost-effective products possessing enhanced adsorption characteristics.

SUMMARY OF THE INVENTION

We have now developed a novel process, which when carried out within specific operational parameters, effects the creation of activated carbons from nutshells possessing enhanced activity for the adsorption of metal ions. This method involves concurrent utilization of chemical activation and atmospheric oxidation with the lignocellulosic material. While not wishing to be held thereto, it is the belief of the inventors that concurrent atmospheric oxidation in conjunction with chemical activation of the nutshell carbon produces metallic ion binding oxygen functions in the mesopore and macropore regions of the carbon. Carbons produced by this process show metal adsorption capacities greater than that possessed by existing commercial carbons.

In accordance with this discovery, it is an object of the invention to provide a means for the creation of high quality metals-adsorbing carbons.

Another object is to provide activated carbon materials having high metal-adsorbing capacity.

Other objects and advantages of the invention will become readily apparent from the ensuing description.

DETAILED DESCRIPTION OF THE INVENTION

The present invention involves the creation of activated carbons from nutshells, which possess enhanced adsorption ability with regard to metal ions. The carbon source for the activated carbons of the present invention may be any nutshell. Exemplary shell materials include almond, pecan, walnut, hazelnut, macadamia nut, coconut and pistachio; with walnut, macadamia nut and pecan shells being preferred.

According to the present invention, the nutshell material is concurrently activated and oxidized. Activation is achieved by chemical means utilizing phosphoric acid. Chemical activation is accomplished by first contacting the lignocellulosic nutshell material with an aqueous solution of phosphoric acid, under conditions and for sufficient time, such that the lignocellulosic material has entrained substantially all the acid it is capable of. This is, for example, accomplished by a process involving an initial cold soak of the nutshell material in an aqueous solution of phosphoric acid, followed by a two-stepped heating of the nutshell-acid mixture so as to drive the acid into the lignocellulosic structure.

Solution temperature constraints applicable to the initial soak are governed by transport phenomena involving the reduction of diffusive processes at lower temperatures and the loss of water, with an incumbent reduction in acid solvation, at temperatures approaching the solution boiling point. With this in mind, useable temperatures for the saturated solution range from about 20° C. to about 90° C., with a preferred range of about 60° C. to about 80° C. Concentration of the phosphoric acid in the aqueous medium may range from about 5% to about 60% by weight of the solution, with a preferred range of about 25% to about 55% by weight of the solution. The amount of solution utilized in relation to the nutshell material is dependent upon the concentration of phosphoric acid therein; mass ratios of acid:nutshell utilized may range from about 0.5:1 to about 1.2:1, preferably about 0.8:1 to about 1:1. Contact time during this soaking stage should be greater than about 1 hour, preferably greater than about 1.5 hours. While no maximum effective contact time is seen to exist, times in excess of approximately 2 hours are not believed to result in any appreciable benefit. Particle size of the nutshell material utilized affects the rate and degree of achievable acid perfusion. In order to achieve penetration of the acid throughout the nutshell material, particle size for the aforementioned conditions should be no larger than US 10 mesh. There is no effective limit to the minimum useable particle size, however, if a granular type product is desired, then it should be no smaller than about US 80 mesh.

Subsequent to the soaking step, the nutshell-acid mixture is then heated in an oxidizing atmosphere, such as that provided by air, to a temperature ranging from about 160° C. to about 180° C. for a period ranging from about 0.5 to about 1 hour. During this step the water is evaporated from the mixture. While not wishing to be bound thereto, it is applicants' theory that, as an effect of the absorbed water molecules being driven out of the lignocellulosic matrix of the nutshell material, a positive driving force is created to absorb additional acid into the structural voids of the nutshell to occupy the space vacated by the water molecules.

The activation process is completed by subjecting the acid-entrained granules to a further heating step under an oxidizing atmosphere, such as air. Temperatures utilized range from about 350° C. to about 550° C., preferably about 400° C. to about 475° C., and times utilized range from about 0.6 hours to about 3 hours, preferably about 1.0 to about 1.5 hours. While not wishing to be bound thereto, it is theorized that the entrained acid, under the physical conditions of the higher temperature regime, acts in a catalytic capacity to assist in the dual functions of creating a cross-linked carbon skeleton, as well as removing organic materials from the carbon lattice through chemical degradation; thus increasing the porosity of material.

During the activation process, the carbon material undergoes concurrent oxidation through its being exposed to air at the elevated temperatures associated with the activation reaction. Subsequent to the concurrent activation and oxidation of the nutshell carbons, the carbon material may be equilibrated to room temperature under an oxidizing atmosphere such as air. This serves to increase the degree of oxidation for the nutshell carbon. The oxidation of the carbon brings about the formation of polar functional groups on the meso- and macro-pores of the carbonized material. It is theorized that these are instrumental in the ability of the carbon to adsorb metal cations such as those selected from the group consisting of Cu(II), Zn(II), Ni(II), Cd(II), Pb(II), Cr(III), Hg(II), Fe(II), Fe (III), Au(I), Ag(I), V(IV), V(V), U(IV), Pu(IV), Cs(I), Sr(II), Al(III), Co(II), and Sn(II), and Sn(IV).

Prior to utilization the carbons created are washed by any means known in the art for the purpose of extracting any acid retained by the carbons at the completion of the oxidation step. While the degree of acid removal desired would be within the purview of the skilled artisan, and be dependent upon situational factors, it is applicant's preference to carry out the wash step until there is no measurable phosphate content in the wash solution as determined by titration with lead nitrate [$Pb(NO_3)_2$].

The following examples are intended to further illustrate the invention and are not intended to limit the scope of the invention which is defined by the claims.

All percentages herein disclosed are by weight unless otherwise specified.

EXAMPLE 1

Shells from almond, black walnut and English walnut, were ground and sieved to a 10×20 mesh (US sieve) particle and mixed in a 1:1 wt ratio with 50 wt % $H_3PO_4$ and allowed to soak for 2 hours at room temperature. The samples were placed in a pyrolysis furnace (Grieve Corporation, Round Lake, Ill.), and flushed with breathing grade air (flowrate= 0.1 m$^3$/h). The samples were heated to 170° C. (±10° C.) where they were held for 0.5 hours (T1). After this low temperature treatment (LTT), they were exposed to a higher heat treatment temperature (HTT) of 450° C. (±5° C.) where they were held for 1 hour (T2). The samples were then allowed to cool to room temperature in an atmosphere of breathing grade air.

After concurrent acid-activation and oxidation the samples were rinsed in a soxhlet extractor with distilled water until the pH was at or near neutral. A small sample of the wash water, as well as the washed carbon (in approximately 50 ml of distilled water) were boiled separately and after cooling assayed with an 0.08 M $Pb(NO_3)_2$ solution to determine the presence of any residual free or loosely bound phosphate. Since this phosphate could conceivably bind with some of the metals in solution, and precipitate them out, the carbons were made phosphate-free. If lead phosphate precipitate appeared in the test sample, then the carbon was washed for a longer period of time until no precipitate was observed. For these samples, approximately 50 g of carbon washed for 24 hours in this manner usually had no detectable phosphate.

The carbons were analyzed for metals uptake using a 10 mM solution of $CuCl_2$ which was made up in an 0.07 molal sodium acetate—0.03 molal acetic acid buffer (pH 4.8). One gram of carbon was stirred for 24 hours in 100 ml of the metal solution. The pH of the slurry was recorded at the start and at the end of the experiment. An aliquot of the solution was drawn off in a disposable syringe, then filtered through an 0.22 mm micrometer Millipore filter (Millipore Corp., Bedford, Mass.), to remove any carbon particles. The sample was diluted 1:10 by volume with 4 vol % $HNO_3$ (Ultrapure, ICP grade) and analyzed by inductively coupled plasma (ICP) spectroscopy using a Leeman Labs Plasma-Spec I sequential ICP (Leeman Labs, Inc., Lowell, Mass.).

Product yields were calculated by the following equation:

Product yield (%)=[($wt_f/wt_i$)×100]

where $wt_i$=weight of shells before acid soak, and $wt_f$=weight of shell carbons after water wash.

The BET surface area measurements were obtained from nitrogen adsorption isotherms at 77° K. using a Micromeritics Gemini 2375 Surface Area Analyzer (Micromeritics Corp., Norcross, Ga.). Specific surface areas ($S_{BET}$) were taken, as in other studies from adsorption isotherms using the BET equation.

The carbons produced from the protocol described above were characterized in terms of product yield, surface area and copper adsorption and were compared to several commercial carbons for copper uptake. The results are presented in Table 1.

TABLE 1

Select properties of nutshell carbons and a comparison of copper adsorption with commercial carbons

| Nutshell or Carbon | Product Yield (%) | Surface Area ($S_{BET}$), m2/g | Cu2+ adsorbed (mmoles/g) |
|---|---|---|---|
| Almond | 30 | 1308 | 0.93 |
| Black Walnut | 39 | 1339 | 0.84 |
| English Walnut | 38 | 1281 | 0.89 |

TABLE 1-continued

Select properties of nutshell carbons and a comparison of copper adsorption with commercial carbons

| Nutshell or Carbon | Product Yield (%) | Surface Area ($S_{BET}$), m2/g | Cu2+ adsorbed (mmoles/g) |
|---|---|---|---|
| Filtrasorb 400[a] | — | 960 | 0.17 |
| Filtrasorb 200 | — | 790 | 0.15 |
| TOG | — | 720 | 0.15 |
| Centaur | — | 720 | 0.13 |
| GRC-20 | — | 870 | 0.19 |
| Vapure | — | 970 | 0.14 |
| RO 3515 | — | 920 | 0.22 |

[a]Seven commercial carbons were evaluated. They are representative of carbons made from bituminous coal, coconut shells and peat, and are used to remove both metals and organic compounds from air and aqueous media. Thus, they represent a cross-section of carbons available for commercial water- and air-treatment systems.

EXAMPLE 2

Shells from almond, black walnut or English walnut were ground to 10×20 mesh particle size, and mixed in a 1:1 wt ratio with 50 wt % $H_3PO_4$ and allowed to soak for 2 hours at room temperature. The protocol given in Example 1 was followed with the following difference: after the nutshell carbons were concurrently activated and oxidized, they were removed from the furnace and quenched in distilled, deionized water. This immediately brought the carbons to room temperature instead of the much slower cool-down to room temperature in the furnace as noted in Example 1.

The results of treating nutshells by this protocol are given in Table 2.

TABLE 2

Select properties of nutshell carbons and a comparison of copper adsorption with commercial carbons.

| Nutshell or Carbon | Product Yield (%) | Surface Area ($S_{BET}$), m2/g | Cu2+ adsorbed (mmoles/g) |
|---|---|---|---|
| Almond | 32 | 1458 | 0.69 |
| Black Walnut | 37 | 1693 | 0.55 |
| English Walnut | 32 | 1642 | 0.63 |
| Filtrasorb 400[a] | — | 960 | 0.17 |
| Filtrasorb 200 | — | 790 | 0.15 |
| TOG | — | 720 | 0.15 |
| Centaur | — | 720 | 0.13 |
| GRC-20 | — | 870 | 0.19 |
| Vapure | — | 970 | 0.14 |
| RO 3515 | — | 920 | 0.22 |

[a]The same commercial carbons were compared as in Table 1.

EXAMPLE 3

Shells of almonds, macadamia nuts or pecans of 10×20 mesh size were mixed in a 1:1 wt ratio with 50 wt % $H_3PO_4$ and allowed to soak for 2 hours at room temperature. The protocol given in Example 2 was followed except that the nutshells were not exposed to the LTT. After the shells were placed in the furnace, the temperature was increased to 450° C. (±5° C.), where they were held for 1 hour. The protocol presented in Examples 1 and 2 were then carried out. The results of treating nutshells by this protocol are shown in Table 3.

TABLE 3

Select properties of nutshell carbons and a comparison of copper adsorption with commercial carbons.

| Nutshell or Carbon | Product Yield (%) | Surface Area ($S_{BET}$), m2/g | Cu2+ adsorbed (mmoles/g) |
|---|---|---|---|
| Almond | 32 | 1483 | 0.56 |
| Macadamia | 39 | 1604 | 0.58 |
| Pecan | 35 | 1639 | 0.52 |
| Filtrasorb 400[a] | — | 960 | 0.17 |
| Filtrasorb 200 | — | 790 | 0.15 |
| TOG | — | 720 | 0.15 |
| Centaur | — | 720 | 0.13 |
| GRC-20 | — | 870 | 0.19 |
| Vapure | — | 970 | 0.22 |
| RO 3515 | — | 920 | 0.22 |

[a]The same commercial carbons were compared as in Table 1.

We claim:

1. A process for the production of activated nutshell carbons comprising the steps of:
   A. contacting a lignocellulosic nutshell material with an aqeous solution of phosphoric acid; and
   B. concurrently activating and oxidizing by heating the composition of step A under continuous exposure to air under conditions effective for production of a concurrently activated and oxidized nutshell carbon.

2. The process of claim 1, further comprising the step of removing the unreacted acid from the oxidized and activated nutshell carbon of step B.

3. The process of claim 1 wherein the lignocellulosic nutshell material is selected from the group consisting of almond, pecan, walnut, hazelnut, macadamia nut, coconut and pistachio.

4. The process of claim 1 wherein the weight ratio of phosphoric acid to lignocellulosic nutshell material utilized in step A ranges from about 0.5:1 to about 1.2:1.

5. The process of claim 1 wherein step B utilizes a two-step heating protocol, wherein the composition of step A is first heated to temperature ranging from about 160° C. to about 180° C. for a time ranging from about 0.5 hours to about 1 hour, and then subsequently heated to a temperature ranging from about 350° C. to about 550° C. for a time ranging from about 0.6 hours to about 3 hours.

6. The process of claim 1 comprising the further step of equilibrating the activated and oxidized nutshell carbon of step B to room temperature under air.

7. An activated nutshell carbon produced by the process of claim 1.

8. A method of removal of metallic ions from a liquid or gaseous medium comprising contacting said medium with the activated carbon of claim 1.

9. The method of claim 8 wherein the metallic ions are metal cations and anions selected from the group consisting of Cu(II), Zn(II), Ni(II), Cd(II), Pb(II), Cr(III), Hg(II), Fe(II), Fe(III), Au(I), Ag(I), V(IV), V(V), U(IV), Pu(IV), Cs(I), Sr(II), Al(III), Co(II), and Sn(II), and Sn(IV).

* * * * *